United States Patent [19]

Edwards

[11] Patent Number: 5,392,145
[45] Date of Patent: Feb. 21, 1995

[54] LIQUID CRYSTAL DISPLAY WITH LIGHT SHIELDING MATRIX CONNECTED TO CONDUCTIVE BAND FOR CROSSTALK SHIELDING

[75] Inventor: Martin J. Edwards, Crawley, United Kingdom

[73] Assignee: U.S. Philips Corporation, New York, N.Y.

[21] Appl. No.: 64,181

[22] Filed: May 9, 1993

[30] Foreign Application Priority Data

May 28, 1992 [GB] United Kingdom ............... 9211282

[51] Int. Cl.$^6$ ...................... G02F 1/13; G02F 1/1335
[52] U.S. Cl. ...................................... 359/67; 359/54; 359/87; 345/43; 345/58
[58] Field of Search .................. 359/84, 85, 87, 88, 359/67, 68, 54, 56, 86, 55; 345/52, 43, 101, 58

[56] References Cited

U.S. PATENT DOCUMENTS 5,265,273 11/1993 Goodwin et al. ............... 455/347
5,285,301 2/1994 Shirahashi et al. ............. 359/87
5,291,322 3/1994 Itoh et al. .................... 359/63

FOREIGN PATENT DOCUMENTS 0333392 9/1989 European Pat. Off. .
1142533 6/1989 Japan .
0338412 10/1989 Japan .
4078822 2/1992 Japan .
2091468 7/1992 United Kingdom .

Primary Examiner—William L. Sikes
Assistant Examiner—Kenneth Parker
Attorney, Agent, or Firm—John C. Fox

[57] ABSTRACT

A matrix liquid crystal display device of the kind having a light shielding matrix (18) in the form of a grid of electrically conductive material carried on the same plate (11) as one set of address conductors (20) and separated therefrom by an insulating layer (21), further includes a conductive band (30) which extends around and contacts the periphery of the grid (18) and exhibits less resistance per unit length than the portions (19) of conductive material constituting the grid, and which is connected at a plurality of points to a predetermined potential, e.g. ground, whereby cross-talk effects due to capacitive couplings between the matrix and the address conductors are reduced.

12 Claims, 2 Drawing Sheets

5,392,145

LIQUID CRYSTAL DISPLAY WITH LIGHT SHIELDING MATRIX CONNECTED TO CONDUCTIVE BAND FOR CROSSTALK SHIELDING

BACKGROUND OF THE INVENTION

This invention relates to a liquid crystal display device comprising a row and column array of liquid crystal display elements defined between two plates which respectively carry sets of row and column address conductors, and a light shielding matrix of electrically conductive material in the form of a grid having portions extending between the display elements which is carried on one of the plates and electrically insulated from the set of address conductors on that plate.

Liquid crystal display devices can employ a matrix of light shielding material to improve display quality. Such a matrix is commonly referred to as a black matrix and consists of a light blocking layer which is patterned in a grid form having strip portions, i.e. sections, which border the display elements and usually slightly overlap the display elements around their edges. The grid prevents un-modulated light from between the display elements degrading the display performance, thereby improving contrast. A metal is preferable as the matrix of the matrix layer since it reflects rather than absorbs light energy and can be provided as a comparatively thin film.

Liquid crystal display devices of the kind having sets of row and column address conductors carried on separate plates can be of the passive variety in which the display elements are formed simply at the cross-overs between the row and column conductors or of the active matrix variety in which one plate carries a row and column array of display element electrodes which are connected to respective address conductors on that plate, usually the row address conductors to which scanning signals are applied, via two terminal non-linear devices such as diodes or MIMs. The other plate carries the matrix of light shielding material together with the other set of address conductors, i.e. the column address conductors to which data signals are applied, each of which extends over an associated column of display element electrodes.

A problem commonly experienced in such liquid crystal display devices which can significantly impair their performance, particular in larger area displays, is that of cross-talk. Cross-talk can occur both horizontally and vertically within the display picture.

Especially horizontal cross-talk can be a serious problem and has been found to be difficult to remove. This is particularly the case with display devices which use a metal black matrix.

OBJECTS AND SUMMARY OF THE INVENTION

It is an object of the present invention to provide a liquid crystal display device of the kind described in the opening paragraph in which the effects of cross-talk, and particularly the aforementioned horizontal cross-talk, are reduced.

According to the present invention, a liquid crystal display device of the kind described in the opening paragraph is characterised in that the light shielding matrix is connected around its periphery to a band of conductive material having a resistance per unit length which is lower than that of the portions of the matrix and in that the band is connected to means for providing a predetermined potential at a plurality of spaced locations therearound.

Preferably, in order to simplify fabrication and ensure good electrical connection with the matrix the band is of the same material as, and integral with, the matrix, in which case the band may have a width which for at least most of its length is greater than the width of the portions of the matrix.

Alternatively, the band may comprise material different to that of the matrix which contacts the matrix around its periphery. In this case, the width of the band need not be greater than the width of the portions if the material selected for the band is less resistive than that of the matrix.

A significant reduction in cross-talk effects is obtained with this display device in operation compared with a similar display device using a conductive black matrix which is electrically isolated. The invention stems from a recognition that the use of a conductive and electrically isolated black matrix is contributory to the occurrence of cross-talk and especially horizontal cross-talk in active matrix display devices in which the light shielding matrix is provided on the plate carrying the set of column conductors to which data signals are applied. Such cross-talk is now believed to be caused by coupling of the data signals between column conductors via the matrix. The voltage on a column conductor then depends to some extent on the data signals provided to other column conductors. In operation signals on the column conductors are coupled onto the matrix via the overlap capacitance. Because the resistance of the matrix is low in comparison to the impedance of overlap capacitance there is little variation in the signal level on the matrix over its area. As a result the voltage on the matrix represents some average of the signals on all the column conductors. The display element voltage $V_p$ is determined by the potential divider action of the resistance of the column conductor and the overlap capacitance. Since the column conductor resistance has a finite value the display element voltage will be influenced by the matrix voltage and therefore the signals on the other column conductors in the display device. This results in horizontal crosstalk.

In the display device of the invention, however, the matrix is held towards a fixed potential, for example, ground. The band extending around the periphery of the matrix and its connection to means for providing a fixed potential at more than one point along its length leads to a very significant reduction in this cross-talk. By using a plurality of spaced connections, the overall level of cross-talk can be reduced by more than an order of magnitude over the case where the matrix is electrically isolated, and hence floating. Such connections are important in view of the resistive properties of the matrix. Merely connecting the matrix at one point has been found to be insufficient for achieving a satisfactory reduction in cross-talk effects. To obtain most beneficial results, the resistance between any point on the matrix and the fixed potential should be relatively low and the multiple connections assist in achieving this objective. In addition, the provision of the band around the periphery of the matrix leads to a further decrease in the resistance between any point on the matrix and the fixed potential, thus further improving the effectiveness.

The band, which preferably extends continuously around the matrix, may be connected to the means for providing a predetermined potential at least at two opposing corners and preferably at all four corners, assuming the matrix is of the usual rectangular shape. The band then ensures that the resistance between any points around the perimeter of the matrix and the fixed potential will be low. Effectively, the perimeter of the matrix is held at or near the fixed potential as well as the corners. It has been found that using this approach, a cross-talk level approximately two orders of magnitude lower than that for a floating matrix can be obtained.

There is described in the English language abstract of JP-A-1-142533 a liquid crystal display device of the passive type in which X and Y electrodes are carried on respective plates and which includes a conductive meshed electrode provided on one plate and separated from the electrodes on that plate by an intervening layer of insulating material, which conductive meshed electrode is connected to ground. It is to be noted, however, that the intended purpose of such grounding is solely to attenuate high frequency electromagnetic noises emanating from the display device, in similar manner to electromagnetic radiation shields applied to CRT faceplates. There is no suggestion that grounding the meshed electrode could have any effect in reducing cross-talk problems. In any event, there is no mention of a peripheral band having a resistance per unit length lower than that of the portions of the meshed electrode, and the matrix is shown as being connected to ground at one point only. Consequently, the described arrangement could not be expected to provide a significant reduction in cross-talk effects.

The invention enables preferred kinds of conductive materials, e.g. metals such as chromium or aluminum, to be used for the matrix without the kind of cross-talk problems experienced hitherto. This is especially important in active matrix display devices for use in projection systems. Although the invention is particularly beneficial for active matrix display devices, it is envisaged that it can also be used to advantage in passive display devices.

BRIEF DESCRIPTION OF THE DRAWINGS

Liquid crystal display devices in accordance with the present invention will now be described, by way of example, with reference to the accompanying drawings, in which.

It should be understood that the Figures are merely schematic and are not drawn to scale.

DESCRIPTION OF THE PREFERRED EMBODIMENTS

Figure 1:
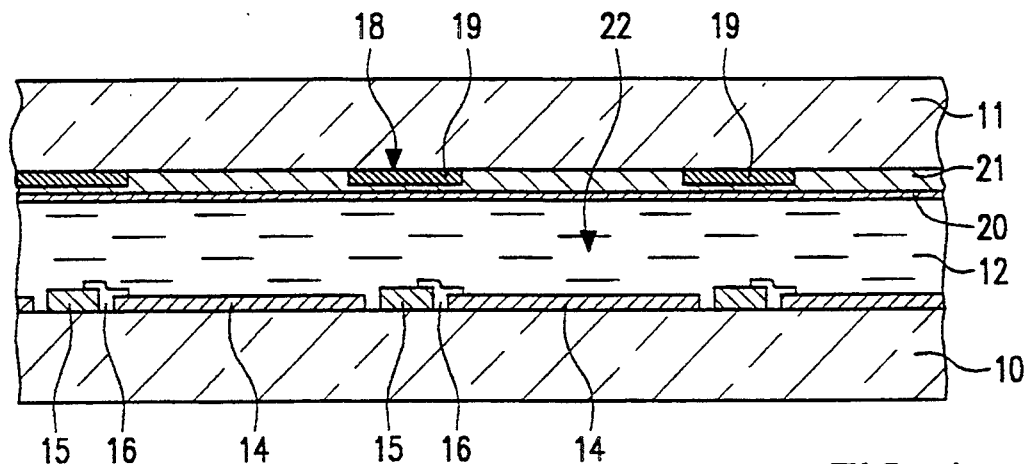
FIG. 1 is a schematic cross-sectional view through a part of a display device according to the present invention.

Referring to FIG. 1, the display device comprises a display panel having two plates 10,11 of transparent insulating material such as glass between which liquid crystal material 12 is contained. The plate 10 carries on its inner surface a set of generally rectangular and transparent display element electrodes 14, for example of ITO, arranged in a row and column array defining a rectangular display area and a set of row address conductors 15 extending between adjacent rows of the electrodes 14. The display element electrodes 14 of a row are connected to an associated row address conductor 15 via one or more respective two terminal nonlinear devices 16, which in this example comprise MIM devices although other devices known in the art, such as diode rings, can be used.

The plate 11 carries on its inner surface a matrix 18 of conductive light shielding material comprising a metal such as chromium or aluminum forming a grid defined by individual strip portions 19, i.e. sections, extending in the row and column directions. Viewed from above, the portions 19 surround each of the display element electrodes 14 with those portions extending in the row direction, as seen in FIG. 1, overlying the row address conductors 15 and MIM devices 16. The light shielding matrix 18, hereinafter referred to as the black matrix, and regions of the surface of the plate 11 between the portions of the matrix, are covered by a continuous layer of transparent insulating material 21 such as silicon nitride on whose surface a set of transparent column address conductors 20, for example of ITO, are provided extending at right angles to the address conductors 15. Each column conductor 20 overlies a respective column of display element electrodes 14, the width of the conductor 20 substantially corresponding to that of the electrodes 14. Conventional liquid crystal orientation layers cover the structures on the inner surfaces of plates 10 and 11 and polariser layers are provided on their outer surfaces in known manner, although these layers are omitted from FIG. 1 for simplicity. Individual display elements 22 in a row and column array are thus constituted by the electrodes 14, the overlying sections of the associated column conductors 20 and the liquid crystal material therebetween.

Figure 2:
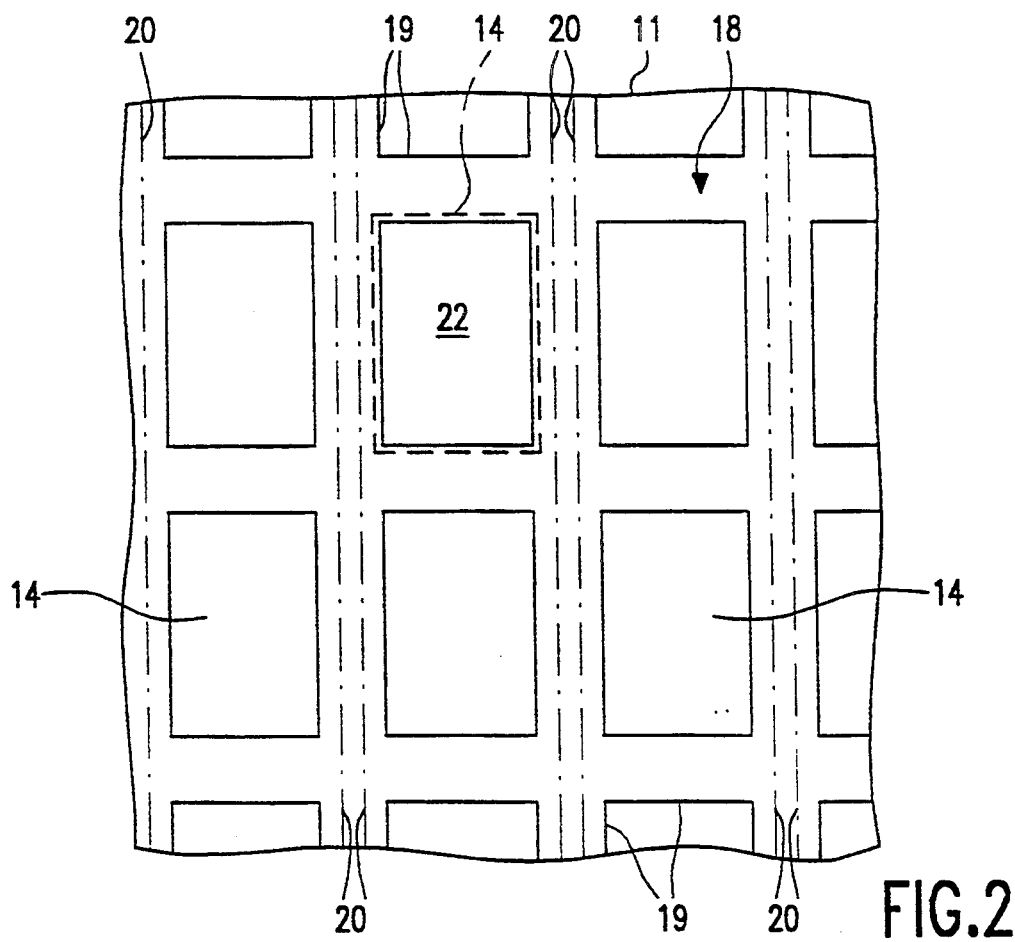
FIG. 2 is a schematic plan view of part of the display device illustrating particularly the arrangement of the column conductors and the light shielding matrix.

FIG. 2 is a plan view of the display device showing more clearly the structure of the black matrix 18 and its relationship with the set of column address conductors and display element electrodes 14. The individual portions 19 constituting the grid structure of the matrix consist of linear strips of constant width and define rectangular width and define rectangular apertures aligned with, and slightly smaller in area than, the electrodes 14, a representative one of which is shown in dotted outline. As can be seen, the portions 19 of the matrix 18 extending in the column direction slightly overlap facing edge portions of adjacent column conductors 20 and the column address conductors 20 completely overlie the portions 19 extending in the row direction.

The display device is manufactured and operated in a conventional manner as described for example in EP-A-0333392 and GB-A-2091468.

Figure 3:
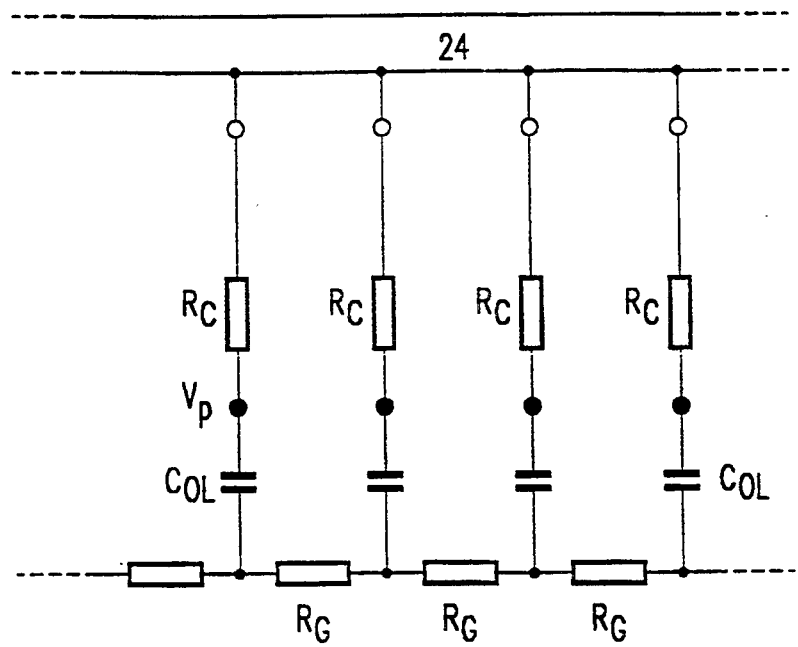
FIG. 3 is a simplified electrical equivalent circuit of a part of the display device for illustrating its electrical behaviour in a situation where the matrix is electrically isolated and allowed to float.

The use of a metal for the black matrix 18 is preferred as metals operate in a reflective rather than absorptive manner. Non-conductive, light absorbing materials suffer from the disadvantages that by absorbing light energy they heat up and consequently degrade the performance of the display device, particularly in the case of devices used in projection systems, and that they are comparatively thick. As previously discussed, it has been determined that a metal black matrix can be a significant cause of horizontal cross-talk effects if it is provided as an electrically isolated layer as data signals are coupled between column conductors via the black matrix and consequently the voltage on any column conductor may then depend to some extent on the data signals applied to other column conductors. In the case for example of a display device displaying a black square on a uniform light background, this cross-talk results in errors in the brightness of the display and manifests itself as less bright regions to either side of the black square. FIG. 3 illustrates a simplified two dimensional electrical equivalent circuit for a typical part of the kind of structure on the plate 11 of the display device of FIGS. 1 and 2 in the case where the black matrix is electrically isolated and allowed to float. The resistors $R_G$ represent the horizontal conduction paths within the black matrix 18 and $C_{OL}$ represents the overlap capacitance between the metal of the matrix 18 and the column conductors 20. The resistance of the column conductors and the lead-in from the column driver circuit, 24, is indicated by $R_C$. $V_p$ indicates a voltage equivalent to the voltage on a column conductor and determines the voltage applied to a display element when it is addressed. With the display device driven using a line inversion drive scheme, alternating data voltages representing the video information are produced by the column driver circuit, typically at a frequency of 15 kHz, and these signals on the column conductors are coupled onto the black matrix via the overlap capacitance. Because the resistance of the matrix is low in comparison to the impedance of $C_{OL}$ there is little variation in the signal level on the grid across the display. As a result the voltage on the matrix represents some average of the signals on all the column conductors of the display. The display element voltage $V_p$ is determined by the potential divider action of $R_C$ and $C_{OL}$. Since the column conductor resistance has a finite value the display element voltage will be influenced by the matrix voltage and therefore the signals on the other column conductors in the display, thus producing horizontal crosstalk.

In order to prevent this effect, the black matrix 18 of the display device is held at or close to a fixed potential, for example ground. To this end, a conductive band is provided which extends around the periphery of the matrix and is connected to the ends of those strip portions 19 at the edge of the matrix. This peripheral band has a resistance per unit length which is less than that of the portions 19 of the matrix and is connected at a plurality of spaced locations around its length to a source at ground potential. An embodiment of the matrix and band arrangement is illustrated schematically in FIG. 4, with an enlarged fragmentary view of an edge part of the matrix and band structure being shown in FIG. 5. The band, referenced at 30, is carried on the plate 11 and extends continuously around the periphery of the matrix 18 outside the rectangular display area. The band 30 is formed unitarily with the matrix 18 from the same deposited layer of metal so that an integral and continuous connection between the band and the matrix is obtained. The band has for at least most of its length a width greater than that of the strip portions 19 and consequently exhibits less resistance per unit length. The width of the band need not be substantially constant. In an alternative embodiment, the band 30 could be formed from a separately deposited layer of conductive material which overlaps and contacts the ends of those portions 19 at the edges of the matrix 18. By using a less resistive material or by increasing the thickness of the layer forming the band, it may not be necessary in this case for the band to be wider.

Figure 4:
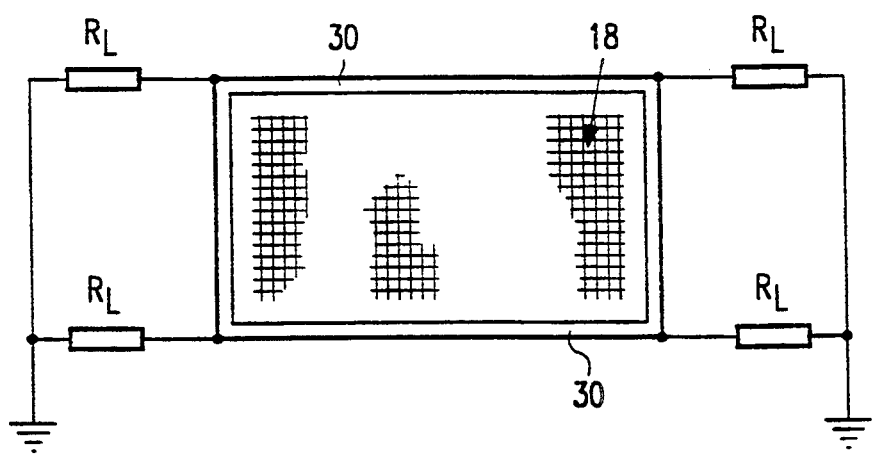
FIG. 4 shows schematically the light shielding matrix and connections thereto as used in the display device.
Figure 5:
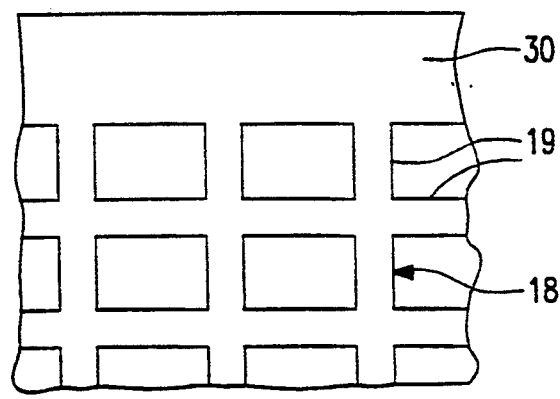
FIG. 5 shows enlarged a typical edge portion of the matrix of FIG. 4.

The band 30 ensures that the resistance at any point on the perimeter of the matrix is low. Connection to ground is made at the four corners as shown in FIG. 4 using conductive leads, for example wires attached to contact points on the band. Inevitably, each connection to the source of ground potential will have an inherent resistance, here represented for simplicity by resistors $R_L$, which includes the lead-in and contact resistance and the value of $R_L$ is minimised as far as possible. The resistance between any point on the black matrix and ground should be as low as possible for optimum effect and ideally the value of $R_L$ should be as close to zero as practicable. The band is intended to ground the complete perimeter of the matrix 18 and the provision of grounding connections at its four corners assists in achieving this. In certain cases, however, it may be sufficient to provide fewer connections, for example at two opposing corners only.

By way of example of typical dimensions and values of components used in an embodiment of the display device using a band formed integrally with the matrix, the resistivity of the column conductors 20 (ITO) is 50 ohms/square, the resistivity of the black matrix (chromium) is 5 ohms/square, the column conductor lead-in resistance is 5K ohms/column, and the grounding lead resistance is 10 ohms. The insulator layer 21 has a thickness of 2 micrometers and a relative permittivity of 6. The band 30 has a width of 2 mm and the linear portions 19 of the matrix have a width of forty micrometers. The column conductors 20 have a width of 150 micrometers and the conductor/metal matrix overlap between columns is five micrometers. All the above dimensions and electrical values are approximate. In this embodiment the level of horizontal cross-talk is almost two orders of magnitude lower than that obtained when the matrix is allowed to float.

Various modifications are possible, as will be apparent to persons skilled in the art. For example, the band may be connected to a source of predetermined potential other than ground. Also, depending on the number and locations of the connections to the band, the band need not be continuous.

The layout of the display elements may be staggered in known manner such that the display elements in a given row are displaced laterally by half a display element with respect to immediately adjacent rows. In this case, the pattern of the grid structure of the black matrix is correspondingly changed.

Although the above-described display device is of the active matrix kind, the invention can also be used to advantage in passive liquid crystal display devices in which the row conductors are of similar width to the column conductors and individual display elements are defined at the regions of the intersections between the row and column conductors.

I claim:

1. A liquid crystal display device comprising a row and column array of liquid crystal display elements defined between two plates which respectively carry sets of row and column address conductors, and a light shielding matrix of electrically conductive material in the form of a grid having portions extending between the display elements which is carried on one of the plates and electrically insulated from the set of address conductors on that plate, characterised in that the light shielding matrix is electrically connected around its periphery to a band of electrically conductive material having a resistance per unit length which is lower than that of the portions of the matrix, and in that the band is electrically connected at a plurality of spaced locations around the band to means for providing a predetermined potential to the matrix.

2. A liquid crystal display device according to claim 1, characterised in that the band is of the same material as, and integral with, the matrix and has for at least most of its length a width which is greater than that of the portions of the matrix.

3. A liquid crystal display device according to claim 2, characterized in that the band is connected to the means for providing a predetermined potential at least at two opposing corners of the band.

4. A liquid crystal display device according to claim 2, characterized in that the band extends continuously around the matrix.

5. A liquid crystal display device according to claim 1, characterised in that the band comprises a layer of material different to that of the matrix which contacts the matrix around its periphery.

6. A liquid crystal display device according to claim 5, characterized in that the band is connected to the means for providing a predetermined potential at least at two opposing corners of the band.

7. A liquid crystal display device according to claim 5, characterized in that the band extends continuously around the matrix.

8. A liquid crystal display device according to claim 1, characterised in that the band is connected to the means for providing a predetermined potential at least at two opposing corners of the band.

9. A liquid crystal display device according to claim 8, characterised in that the band is connected to the means for providing a predetermined potential at its four corners.

10. A liquid crystal display device according to claim 9, characterized in that the band extends continuously around the matrix.

11. A liquid crystal display device according to claim 1, characterised in that the band extends continuously around the matrix.

12. A liquid crystal display device according to claim 8, characterised in that the band extends continuously around the matrix.

* * * * *